United States Patent

Tsuneyama et al.

(10) Patent No.: US 9,452,785 B2
(45) Date of Patent: Sep. 27, 2016

(54) VEHICLE COWL PORTION STRUCTURE

(71) Applicant: TOYOTA JIDOSHA KABUSHIKI KAISHA, Toyota-shi, Aichi-ken (JP)

(72) Inventors: Teppei Tsuneyama, Nagoya (JP); Tatsunori Hayakawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/019,789

(22) Filed: Feb. 9, 2016

(65) Prior Publication Data

US 2016/0236720 A1 Aug. 18, 2016

(30) Foreign Application Priority Data

Feb. 16, 2015 (JP) ................................. 2015-027576

(51) Int. Cl.
*B62D 25/08* (2006.01)
*B62D 21/15* (2006.01)

(52) U.S. Cl.
CPC ........... *B62D 21/157* (2013.01); *B62D 25/081* (2013.01)

(58) Field of Classification Search
CPC ........................... B62D 21/157; B62D 25/081
USPC ......................................................... 296/192
IPC ...................................................... B62D 21/15
See application file for complete search history.

(56) References Cited

U.S. PATENT DOCUMENTS

| 4,819,550 | A | * | 4/1989 | Ioka | B62D 25/081 |
| | | | | | 454/147 |
| 4,848,835 | A | * | 7/1989 | DeRees | B62D 21/02 |
| | | | | | 280/756 |
| 5,201,566 | A | * | 4/1993 | Mori | B62D 21/11 |
| | | | | | 296/192 |
| 6,193,304 | B1 | * | 2/2001 | Takahashi | B60J 1/02 |
| | | | | | 296/187.04 |
| 7,347,491 | B2 | * | 3/2008 | Mouch | B62D 25/025 |
| | | | | | 296/193.06 |
| 7,540,557 | B2 | * | 6/2009 | Shimura | B62D 25/081 |
| | | | | | 296/192 |
| 8,136,870 | B2 | * | 3/2012 | Ott | B60R 21/34 |
| | | | | | 296/192 |
| 9,359,010 | B2 | * | 6/2016 | Hayakawa | B62D 25/081 |
| 2013/0181482 | A1 | * | 7/2013 | Suzaki | B62D 25/081 |
| | | | | | 296/192 |
| 2016/0023687 | A1 | * | 1/2016 | Ichikawa | B62D 25/081 |
| | | | | | 296/192 |

FOREIGN PATENT DOCUMENTS

| JP | 06227433 A | * | 8/1994 |
| JP | 2005-280680 A | | 10/2005 |
| JP | 2008-024035 A | | 2/2008 |
| JP | 2008-260331 A | | 10/2008 |
| JP | 2009-029292 A | | 2/2009 |
| JP | 2009-090928 A | | 4/2009 |

(Continued)

*Primary Examiner* — Pinel Romain
(74) *Attorney, Agent, or Firm* — Oliff PLC

(57) ABSTRACT

A vehicle cowl portion structure includes: a cowl top panel extending in a vehicle width direction; a cowl inner panel extending in the vehicle width direction at a lower side of the cowl top panel, including an inner panel-side joint portion joined to the cowl top panel and an extension wall extending from the inner panel-side joint portion toward the lower side and having a bent portion; and a reinforcement extending in the vehicle width direction, and including (i) an upper end portion that is joined to the cowl inner panel or the cowl top panel at a position above the bent portion, (ii) a lower end portion that is joined to the cowl inner panel below the bent portion, and (iii) a vertical wall extending in a vehicle up-down direction as seen in a side sectional view and that has a hole.

10 Claims, 9 Drawing Sheets

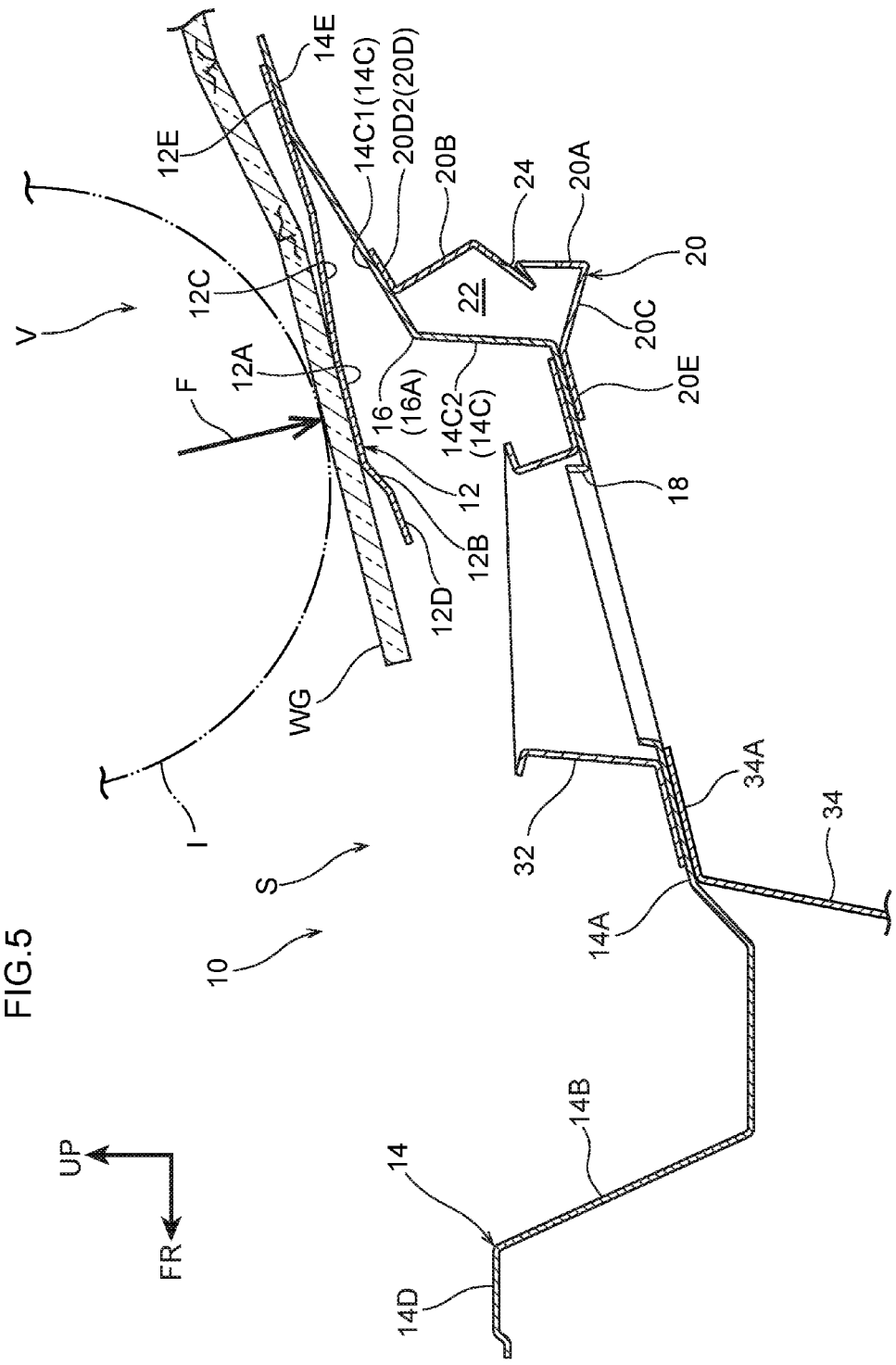

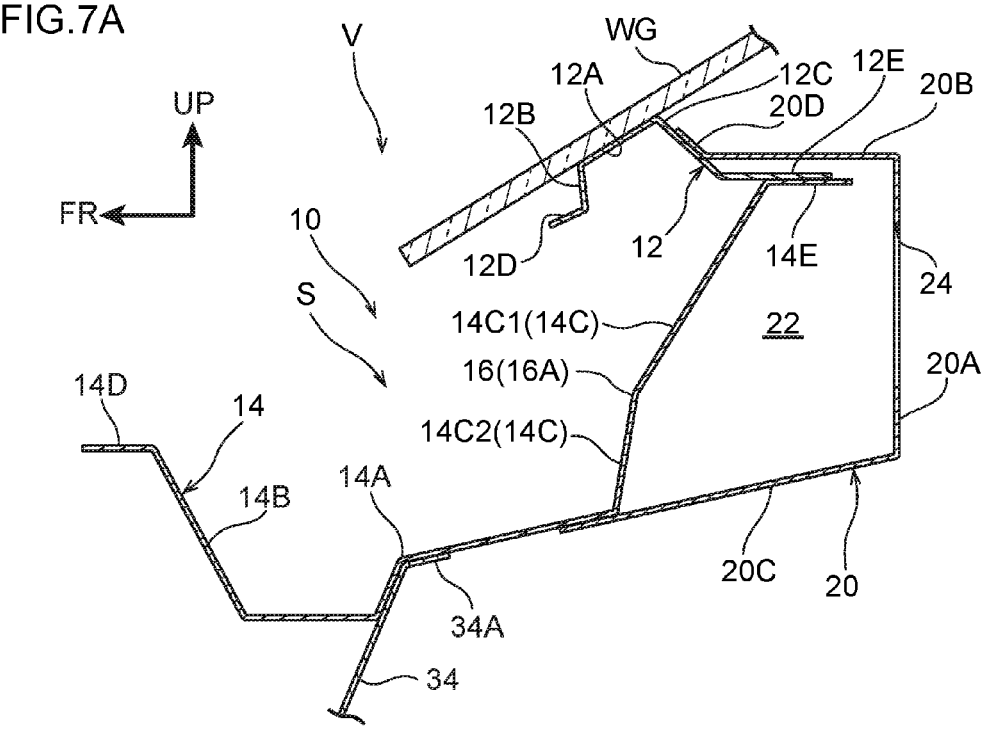
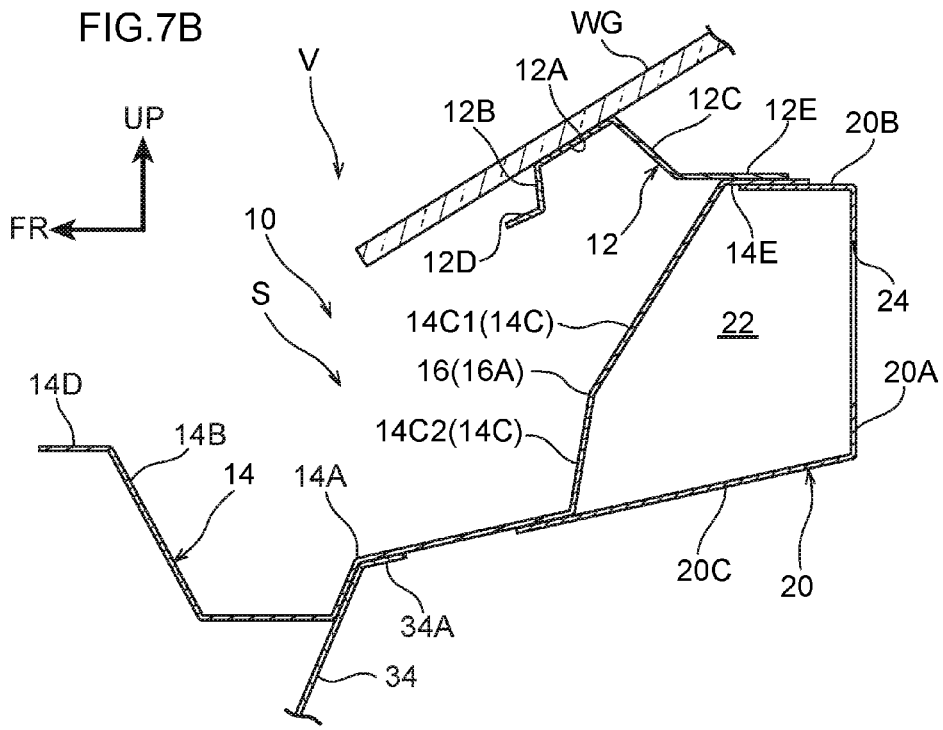

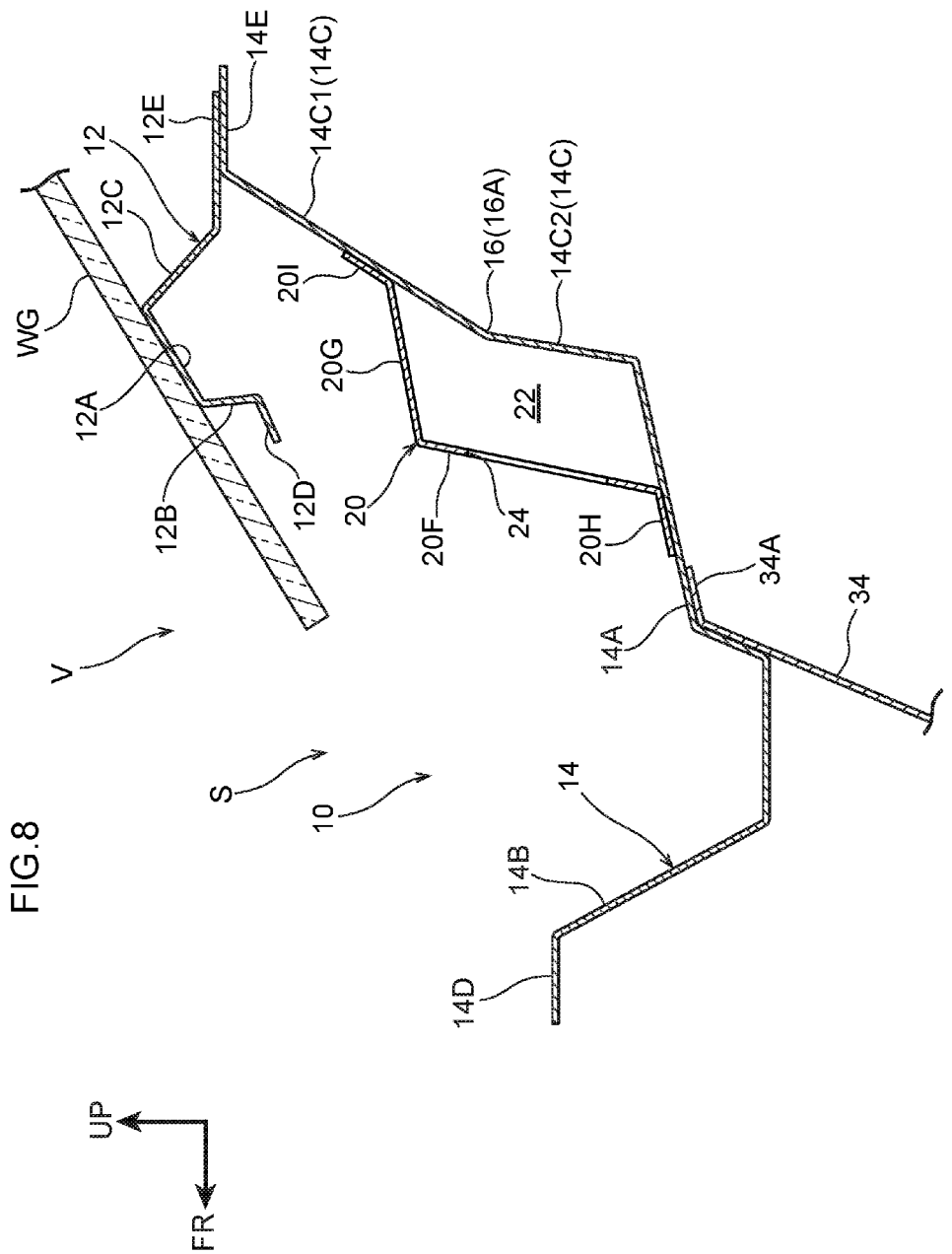

VEHICLE COWL PORTION STRUCTURE

CROSS-REFERENCE TO RELATED APPLICATION

This application is based on and claims priority under 35 USC 119 from Japanese Patent Application No. 2015-027576 filed on Feb. 16, 2015, the entire disclosure of which is incorporated by reference herein.

BACKGROUND

1. Technical Field

The present disclosure relates to a vehicle cowl portion structure.

2. Related Art

Japanese Patent Application Laid-open (JP-A) No. 2009-090928 discloses a vehicle cowl portion structure including a cowl lower panel (a cowl inner panel) that opens toward the vehicle upper side as seen in a side sectional view, a cowl upper panel (a cowl top panel) that is placed at the vehicle upper side of the cowl lower panel, and a cowl reinforcement (a reinforcement) that is placed at the vehicle rear side of the cowl lower panel.

Furthermore, a rear wall portion of the cowl lower panel is bent toward the vehicle rear side and obliquely upward, and a closed cross section is formed by the rear wall portion and the cowl upper panel. When an impact load toward the vehicle lower side is input to the cowl upper panel, the closed cross section becomes crushed to thereby absorb the impact energy. In other words, the area in which the closed cross section (a chamber) is formed is configured as an area that absorbs the impact energy (hereinafter this area will be called "the energy absorption area").

Furthermore, the cowl reinforcement is formed in a cross-sectionally substantially U-shape that opens toward the vehicle front side, and the upper and lower end portions of the cowl reinforcement are joined to the cowl lower panel at the vehicle lower side of the energy absorption area. Because of this, the vehicle cowl portion structure is configured such that front and rear vibration of the cowl lower panel and so forth can be controlled (the noise and vibration performance of the vehicle can be improved) while reducing the effect that the cowl reinforcement has on the impact energy absorption performance. JP-A No. 2008-024035, JP-A No. 2009-029292, JP-A No. 2008-260331, and JP-A No. 2012-001005 disclose other related vehicle cowl portion structures.

In this connection, in recent years, designs for vehicles having a low vehicle height have been in demand from the standpoint of improving the market appeal and the fuel economy performance of vehicles. That is, there are cases in which the position where the cowl portion is installed is set relatively at the vehicle lower side. However, depending on the position where the cowl portion is installed, there are cases in which part (the upper end portion) of the cowl reinforcement is placed in the energy absorption area to prevent interference between the cowl portion and peripheral parts. In this case, the crushing of the closed cross section is suppressed by the cowl reinforcement and there is the concern that the impact energy absorption performance will be poor. Consequently, it is preferred that the vehicle cowl portion structure be configured such that a balance can be achieved between the noise and vibration performance and the impact energy absorption performance of the vehicle.

SUMMARY

In consideration of the circumstances described above, the present disclosure provides a vehicle cowl portion structure with which a balance can be achieved between the noise and vibration performance and the impact energy absorption performance of the vehicle.

One aspect of the present disclosure is a vehicle cowl portion structure including: a cowl top panel that is configured to extend in a vehicle width direction along a lower end portion of a windshield; a cowl inner panel that is configured to extend in the vehicle width direction on a vehicle lower side of the cowl top panel, the cowl inner panel including an inner panel-side joint portion that is joined to the cowl top panel and an extension wall that extends from the inner panel-side joint portion toward the vehicle lower side and has a bent portion, the cowl inner panel bending at the bent portion upon receipt of a predetermined impact load toward the vehicle lower side; and a reinforcement that is configured to extend in the vehicle width direction, the reinforcement including (i) an upper end portion that is joined to the cowl inner panel or the cowl top panel at a position that is on a vehicle upper side of the bent portion, (ii) a lower end portion that is joined to the cowl inner panel at a position that is on a vehicle lower side of the bent portion, and (iii) a vertical wall that extends in a vehicle up and down direction as seen in a side sectional view, the vertical wall having a hole for shock absorption that extends through the vertical wall.

In the above aspect, the cowl top panel extends in the vehicle width direction along the lower end portion of the windshield. The cowl inner panel that extends in the vehicle width direction is disposed at the vehicle lower side of the cowl top panel, and the inner panel-side joint portion of the cowl inner panel is joined to the cowl top panel. Furthermore, the cowl inner panel includes the extension wall. The extension wall extends toward the vehicle lower side from the inner panel-side joint portion, and the bent portion is formed in the extension wall. When an impactor (object) impacts on the lower end portion of the windshield and a predetermined impact load toward the vehicle lower side is input, the cowl inner panel bends at the bent portion. Consequently, the area between the bent portion of the cowl inner panel and the windshield is configured as an area that absorbs the impact energy (hereinafter this area will be called "the energy absorption area").

Furthermore, the upper end portion of the reinforcement that extends in the vehicle width direction is joined to the cowl inner panel or the cowl top panel at a position that is on the vehicle upper side of the bent portion of the cowl inner panel. For this reason, the upper end portion of the reinforcement is placed in the energy absorption area.

The lower end portion of the reinforcement is joined to the cowl inner panel at a position that is on the vehicle lower side of the bent portion. Because of this, the cowl inner panel is reinforced by the reinforcement. Consequently, vehicle front and rear direction vibration of the cowl portion is controlled by the reinforcement, so the noise and vibration performance of the vehicle can be improved.

Here, the reinforcement has the vertical wall that extends in the vehicle up and down direction as seen in a side sectional view, and the hole for shock absorption is formed in the vertical wall. That is, in the vertical wall, the rigidity of the region around the area where the hole is formed is lower than the rigidity of other regions. For this reason, when an impact load toward the vehicle lower side is input to the cowl top panel, the reinforcement can be deformed in the vehicle up and down direction at the hole. Because of this, the cowl inner panel bends at the bent portion, and the joint portion becomes displaced toward the vehicle lower side together with the cowl top panel. Consequently, even in a case in which the upper end portion of the reinforcement is placed in the energy absorption area, the impact energy can be absorbed.

In this way, according to the above aspect, a balance can be achieved between the noise and vibration performance and the impact energy absorption performance of the vehicle.

In the above aspect, the reinforcement may be located at the vehicle rear side of the extension wall.

In this configuration, since the reinforcement is located at the vehicle rear side of the vertical wall of the cowl inner panel, for example, an impactor (object) impacting on the lower end portion of the windshield can be kept from hitting the reinforcement.

In the above aspect, the reinforcement may be located at the vehicle front side of the extension wall.

In this configuration, since the reinforcement is located at the vehicle front side of the vertical wall of the cowl inner panel, the cowl inner panel can be installed so as to prevent interference between the reinforcement and peripheral parts placed at the vehicle rear side of the cowl inner panel.

In the above aspect, the cowl inner panel may be formed in a recessed shape that opens toward a vehicle upper side as seen in a side sectional view, and the lower end portion of the reinforcement may be joined to a bottom wall of the cowl inner panel.

In this configuration, since the lower end portion of the reinforcement is joined to the bottom wall of the cowl inner panel, the area of the closed cross section (chamber) formed by the reinforcement and the cowl inner panel can be set relatively large. Because of this, the reinforcement effect that the reinforcement has on the cowl inner panel can be enhanced.

In the above aspect, the cowl top panel may include a top panel-side joint portion that is joined to the inner panel-side joint portion, an opposing wall that is configured to be placed opposing the lower end portion of the windshield, and a coupling wall that couples the top panel-side joint portion and the opposing wall to one another, and the upper end portion of the reinforcement may be joined to the coupling wall.

In this configuration, since the upper end portion of the reinforcement is joined to the coupling wall that couples the top panel-side joint portion and the opposing wall to one another, in this case also, the area of the closed cross section formed by the reinforcement and the cowl inner panel can be set relatively large. Because of this, the reinforcement effect that the reinforcement has on the cowl inner panel can be enhanced.

In the above aspect, the upper end portion of the reinforcement may be joined to a joint location where the cowl top panel and the inner panel-side joint portion of the cowl inner panel are joined to one another.

In this configuration, since the upper end portion of the reinforcement is joined to the joint location where the cowl top panel and the cowl inner panel are joined to one another, the impact load input to the cowl top panel can be efficiently transmitted to the upper end portion of the reinforcement and the reinforcement can be efficiently deformed.

The above aspect may further include a recessed cowl top reinforcement that is disposed at the vehicle lower side of the cowl top panel and opens substantially upward and obliquely forward as seen in a side sectional view, and a front end portion of the cowl top reinforcement may be joined to a front end portion of the cowl top panel, a rear end portion of the cowl top reinforcement may be interposed between a rear end portion of the cowl top panel and the inner panel-side joint portion of the cowl inner panel and interconnects the cowl top panel and the cowl inner panel.

In the above aspect, the bent portion of the cowl inner panel may be bent so as to project toward the vehicle front side.

In the above aspect, the bent portion of the cowl inner panel may be bent so as to project toward the vehicle rear side.

In the above aspect, the cowl inner panel may be formed in a recessed shape that opens toward the vehicle front side as seen in a side sectional view.

These configurations may also achieve a balance between the noise and vibration performance and the impact energy absorption performance of the vehicle.

BRIEF DESCRIPTION OF THE DRAWINGS

An exemplary embodiment will be described in detail based on the following figures, wherein:

FIG. 5 is a side sectional view, seen from the vehicle left side, for describing, in relation to the cowl portion shown in FIG. 1, deformation of the cowl portion when an impactor has impacted on the lower end portion of the windshield;

FIG. 7A is a side sectional view, seen from the vehicle left side, showing a cowl portion of variation 5;

FIG. 7B is a side sectional view, seen from the vehicle left side, showing a cowl portion of variation 6; and FIG. 8 is a side sectional view, seen from the vehicle left side, showing a cowl portion of variation 7.

DETAILED DESCRIPTION

Figure 1:
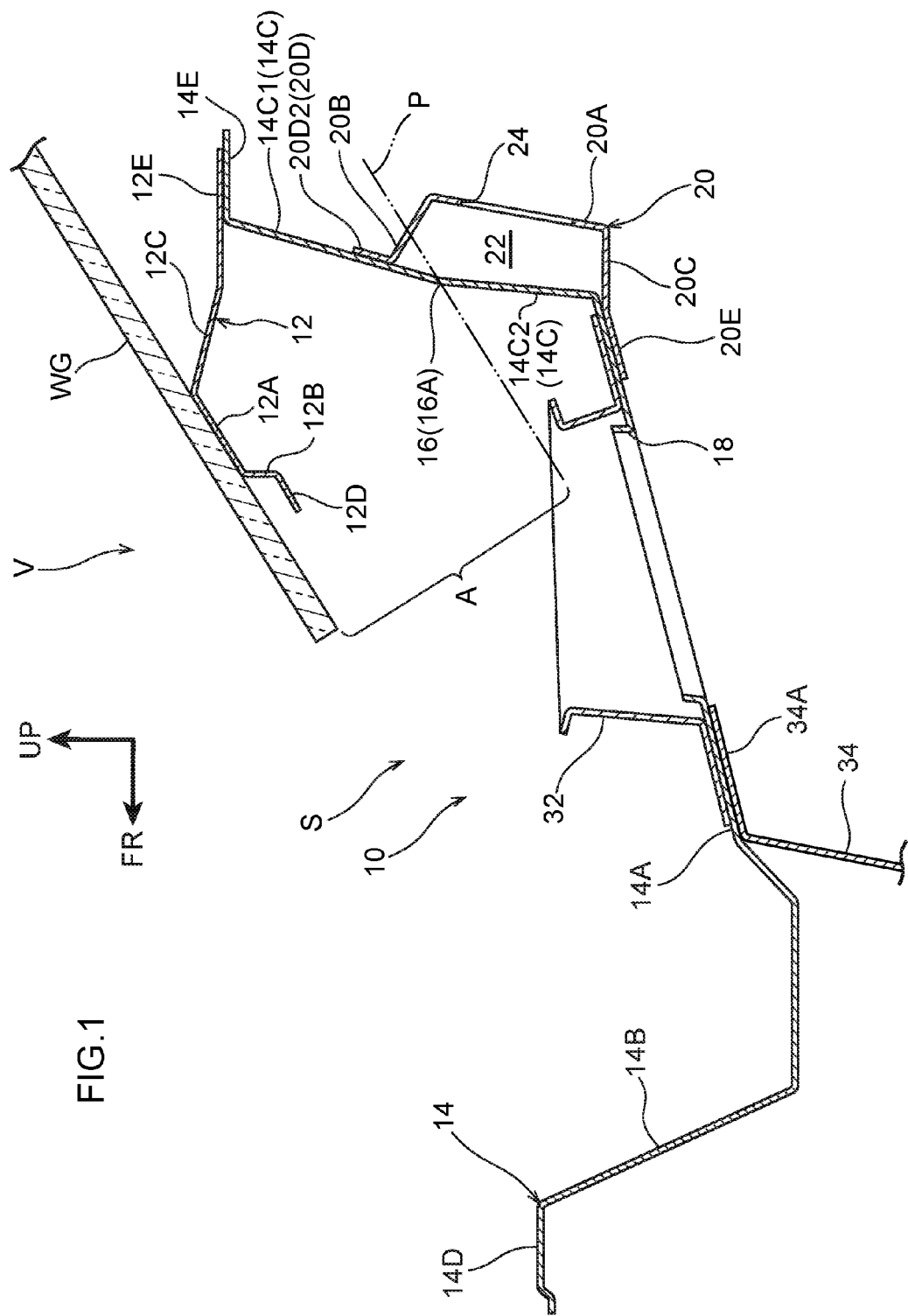
FIG. 1 is a side sectional view (an enlarged sectional view along line 1-1 of FIG. 2), seen from a vehicle left side, showing a vehicle right side section of a cowl portion to which a vehicle cowl portion structure pertaining to the embodiment has been applied.

A cowl portion 10 of a vehicle (automobile) V to which a vehicle cowl portion structure S pertaining to an exemplary embodiment has been applied will be described below using the drawings. It should be noted that, in the drawings, arrow FR indicates the vehicle front side, arrow UP indicates the vehicle upper side, and arrow LH indicates the vehicle left side (one side in the vehicle width direction). Unless otherwise noted, when description is given below simply using the directions of front and rear, up and down, and right and left, these will be understood to mean front and rear in the vehicle front and rear direction, up and down in the vehicle up and down direction, and right and left in the vehicle right and left direction.

Figure 2:
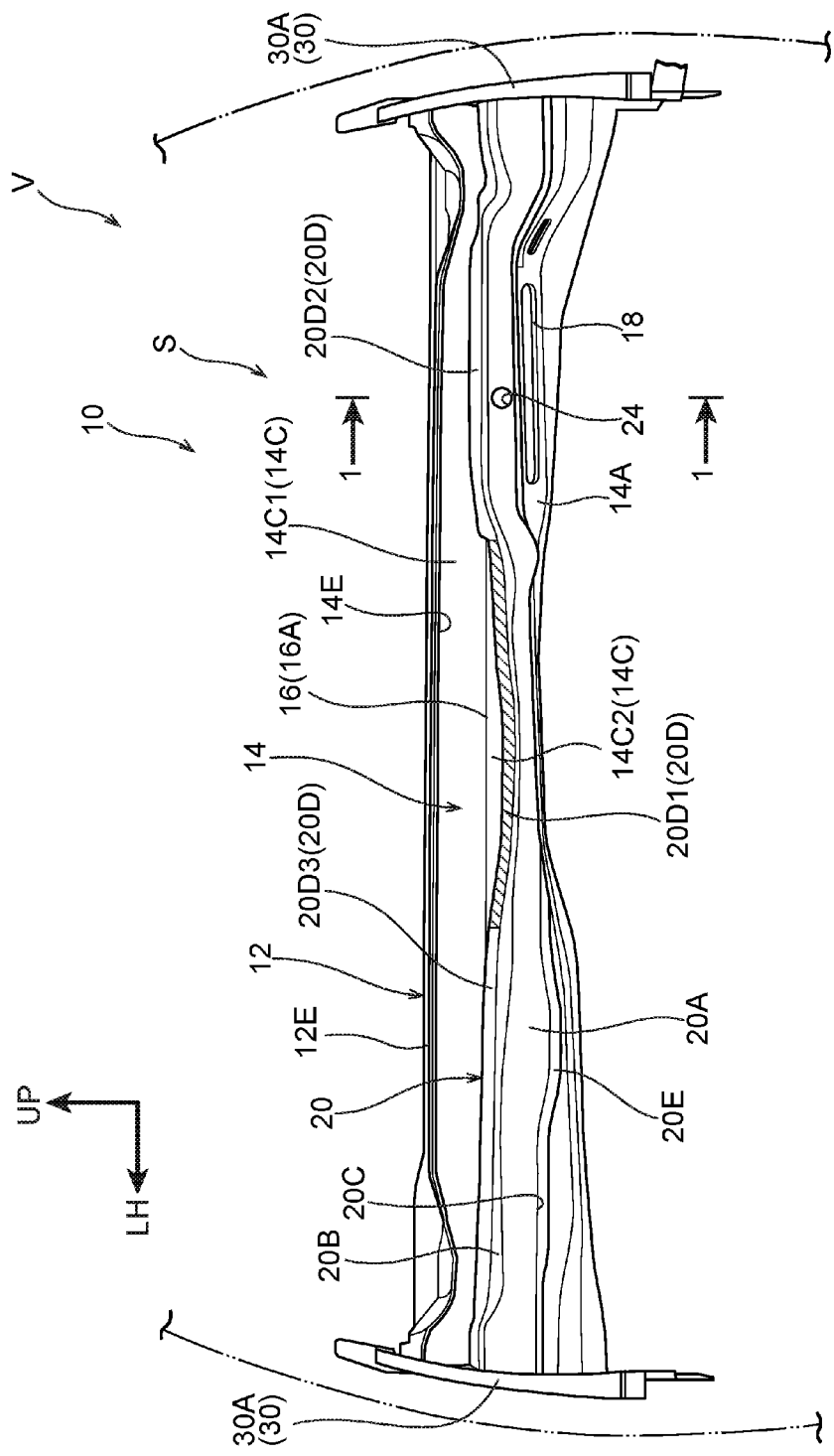
FIG. 2 is a back view, seen from a vehicle rear side, of the entire cowl portion shown in FIG. 1.

As shown in FIG. 1 and FIG. 2, the cowl portion 10 includes a cowl top panel 12 that configures the upper side section of the cowl portion 10, a cowl inner panel 14 that is placed at the lower side of the cowl top panel 12, and a cowl reinforcement 20 serving as a "reinforcement" that reinforces the cowl inner panel 14.

As shown in FIG. 1, the cowl top panel 12 extends in the vehicle width direction along a lower end portion of a windshield WG of the vehicle V. The cowl top panel 12 is made of a steel panel and is formed in a substantially hat-shaped cross-section that is opened substantially downward and obliquely rearward as seen in a side sectional view. Specifically, the cowl top panel 12 includes a top wall 12A serving as an "opposing wall" that is placed substantially parallel to the windshield WG, a front wall 12B that extends substantially downward from the front end of the top wall 12A, and a rear wall 12C serving as a "coupling wall" that extends substantially downward and obliquely rearward from the rear end of the top wall 12A. Furthermore, the cowl top panel 12 has a front flange 12D, which extends forward from the front end of the front wall 12B and is placed substantially parallel to the windshield WG, and a rear flange 12E, which serves as a "top panel-side joint portion" that extends substantially rearward from the rear end of the rear wall 12C. Thus, the top wall 12A and the rear flange 12E are coupled to one another by the rear wall 12C.

The top wall 12A of the cowl top panel 12 is placed opposing the lower end portion of the windshield WG and is joined by an adhesive, for example, to the lower surface of the windshield WG. Furthermore, both vehicle width direction end portions of the cowl top panel 12 are joined by welding, for example, to front pillar inner panels 30A configuring a right and left pair of front pillars 30 disposed at the side portions of the vehicle V (see FIG. 2).

The cowl inner panel 14 extends in the vehicle width direction at the lower side of the cowl top panel 12. The cowl inner panel 14 is made of a steel panel and is formed in a substantially hat-shaped (a recessed-shape) cross-section that is opened substantially upward as seen in a side sectional view. Specifically, the cowl inner panel 14 includes a bottom wall 14A that configures the lower portion of the cowl inner panel 14, a front wall 14B that extends substantially upward and obliquely forward from the front end of the bottom wall 14A, and a rear wall 14C serving as an "extension wall" that extends substantially upward from the rear end of the bottom wall 14A. Furthermore, the cowl inner panel 14 has a front flange 14D that extends substantially forward from the front end of the front wall 14B, and a rear flange 14E that serves as an "inner panel-side joint portion" that extends substantially rearward from the rear end of the rear wall 14C.

The rear flange 14E of the cowl inner panel 14 is placed adjacent to the lower side of the rear flange 12E of the cowl top panel 12, and the rear flange 14E and the rear flange 12E are joined to one another by welding, for example. Because of this, the rear wall 14C of the cowl inner panel 14 extends downward from the rear flange 14E. The rear wall 14C is placed inclined rearward heading upward relative to the up and down direction as seen in a side sectional view. For this reason, the "extension wall that extends from the joint portion toward the vehicle lower side" in the present disclosure also includes a state in which the extension wall is inclined relative to the up and down direction. Furthermore, both vehicle width direction end portions of the cowl inner panel 14 are joined by welding, for example, to the right and left pair of front pillars 30 (the front pillar inner panels 30A) (see FIG. 2).

Moreover, the rear wall 14C of the cowl inner panel 14 is bent such that its up and down direction middle portion projects forward and obliquely upward. In other words, the rear wall 14C is bent such that the upper portion of the rear wall 14C is inclined rearward relative to the lower portion of the rear wall 14C. The bent section in the up and down direction middle portion of the rear wall 14C is a bent portion 16, and in the region of the bent portion 16 a bend ridgeline 16A extends in the vehicle width direction in the rear wall 14C. Furthermore, the section of the rear wall 14C at the upper side of the bent portion 16 is an upper rear wall portion 14C1 and the section of the rear wall 14C at the lower side of the bent portion 16 is a lower rear wall portion 14C2.

Although details will be described later, the cowl portion 10 is configured such that, when a downward predetermined impact load is input to the lower end portion of the windshield WG, the cowl inner panel 14 bends at the bend ridgeline 16A (the bent portion 16), and the rear flange 14E and the upper rear wall portion 14C1 become displaced downward together with the windshield WG and the cowl top panel 12. The area from the windshield WG to the bend ridgeline 16A (the bent portion 16) is an energy absorption area A. Furthermore, the distance from the windshield WG to the bend ridgeline 16A (the bent portion 16) is a set stroke, and the set stroke is set to 50 mm to 100 mm, for example. Moreover, the position of a hypothetical line passing through the bend ridgeline 16A (the bent portion 16) and extending parallel to the windshield WG as seen in a side view is a stroke end position P.

Moreover, as shown in FIG. 2, an open portion (opening) 18 for an air conditioner duct is formed in the right side section of the bottom wall 14A of the cowl inner panel 14. The open portion 18 is formed in a long hole shape whose lengthwise direction coincides with the vehicle width direction. Furthermore, as shown in FIG. 1, a tubular member 32 for controlling the ingress of water and the like into the open portion 18 is disposed at the upper side of the bottom wall 14A, and the tubular member 32 is placed around the open portion 18.

Furthermore, a dash panel 34 that partitions the engine compartment and the cabin of the vehicle V from one another is disposed at the vehicle lower side of the cowl inner panel 14. The dash panel 34 is made of a steel panel and is placed such that its panel thickness direction substantially coincides with the front and rear direction. A rearwardly bent upper flange 34A is formed at the upper end portion of the dash panel 34. The upper flange 34A is placed adjacent to the lower side of the bottom wall 14A of the cowl inner panel 14 and is joined by welding, for example, to the bottom wall 14A. For this reason, the bottom wall 14A of the cowl inner panel 14 is supported from its lower side by the dash panel 34. Furthermore, the rear wall 14C of the cowl inner panel 14 is placed between the joint portions where the cowl inner panel 14 is joined to the cowl top panel 12 and the dash panel 34, and the rear wall 14C extends in the up and down direction.

Next, the cowl reinforcement 20 that is the main part of the present embodiment will be described. The cowl reinforcement 20 is placed at the rear side of the rear wall 14C of the cowl inner panel 14 and extends in the vehicle width direction. The cowl reinforcement 20 is made of a steel panel and is formed in a substantially U-shaped cross-section that is opened substantially forward as seen in a side sectional view. Specifically, the cowl reinforcement 20 includes a vertical wall 20A that extends in the substantially up and down direction as seen in a side sectional view, an upper wall 20B that extends substantially forward and obliquely upward from the upper end of the vertical wall 20A, and a lower wall 20C that extends substantially forward from the lower end of the vertical wall 20A. Furthermore, the cowl reinforcement 20 has an upper flange 20D, which extends substantially upward from the front end of the upper wall 20B, and a lower flange 20E, which extends substantially forward from the front end of the lower wall 20C and is placed substantially parallel to the bottom wall 14A of the cowl inner panel 14.

The vertical wall 20A of the cowl reinforcement 20 is placed so as to be slightly inclined rearward heading upward as seen in a side sectional view. In other words, the vertical wall 20A is placed slightly inclined relative to the up and down direction as seen in a side sectional view. Thus, the "vertical wall that extends in the vehicle up and down direction as seen in a side sectional view" in the present disclosure also includes a case in which the vertical wall is placed inclined relative to the up and down direction as seen in a side sectional view.

As shown in FIG. 2, the upper flange 20D of the cowl reinforcement 20 is curved so as to project downward in its vehicle width direction central section, and this curved vehicle width direction central section (the hatched section in FIG. 2) of the upper flange 20D is an upper flange central portion 20D 1. Furthermore, the right side section of the upper flange 20D (the section at the right side of the upper flange central portion 20D1) is an upper flange right side portion 20D2, and the left side section of the upper flange 20D (the section at the left side of the upper flange central portion 20D 1) is an upper flange left side portion 20D3. In the present embodiment, the upper flange right side portion 20D2 is placed slightly on the upper side of the upper flange left side portion 20D3.

As shown in FIG. 1, the upper flange right side portion 20D2 is placed adjacent to the rear side of the upper rear wall portion 14C1 of the cowl inner panel 14 and is joined by welding, for example, to the upper rear wall portion 14C1. Thus, the upper flange right side portion 20D2 of the cowl reinforcement 20 is joined to the cowl inner panel 14 at a position that is on the upper side of the bend ridgeline 16A (the bent portion 16) of the cowl inner panel 14 and is placed in the energy absorption area A.

As shown in FIG. 2, the upper flange central portion 20D1 and the upper flange left side portion 20D3 are placed adjacent to the rear side of the lower rear wall portion 14C2 of the cowl inner panel 14 and are joined by welding, for example, to the lower rear wall portion 14C2. That is, in the present embodiment, part (the upper flange right side portion 20D2) of the upper flange 20D is joined to the cowl inner panel 14 at a position that is on the upper side of the bend ridgeline 16A (the bent portion 16). Thus, the "upper end portion of the reinforcement is joined to the cowl inner panel at a position that is on the vehicle upper side of the bent portion" also includes a case in which part of the upper end portion of the reinforcement is joined to the cowl inner panel at a position that is on the vehicle upper side of the bent portion.

Furthermore, as shown in FIG. 1, the lower flange 20E of the cowl reinforcement 20 is placed adjacent to the lower side of the rear end portion of the bottom wall 14A of the cowl inner panel 14 and is joined by welding, for example, to the bottom wall 14A. Because of this, the cowl reinforcement 20 is joined to the cowl inner panel 14 so as to cover (straddle) the bend ridgeline 16A (the bent portion 16) from the rear side, so that a closed cross section (an enclosed chamber) 22 is formed by the cowl inner panel 14 and the cowl reinforcement 20. Moreover, both vehicle width direction end portions of the cowl reinforcement 20 are joined by welding, for example, to the right and left pair of front pillars 30 (the front pillar inner panels 30A) (see FIG. 2). Thus, the cowl reinforcement 20 reinforces the cowl inner panel 14, and front and rear direction vibration of the cowl inner panel 14 and the dash panel 34 is controlled by the cowl reinforcement 20.

Furthermore, as shown in FIG. 1 and FIG. 2, a hole portion (hole) 24 for shock absorption is formed through the vertical wall 20A of the cowl reinforcement 20 in a position corresponding to the upper flange right side portion 20D2. The hole portion 24 is formed in a circular shape and is placed in the up and down direction middle portion of the vertical wall 20A. Because of this, the vertical wall 20A of the cowl reinforcement 20 is configured such that the up and down direction rigidity of the region around the hole portion 24 is lower than the up and down direction rigidity of other regions. The cowl portion 10 is configured such that, when a predetermined impact load toward the vehicle lower side is input to the windshield WG, the cowl reinforcement 20 deforms in the up and down direction starting at the hole portion 24.

Next, the action and effects of the present embodiment will be described.

In the cowl portion 10 configured as described above, the cowl reinforcement 20 extends in the vehicle width direction at the rear side of the rear wall 14C of the cowl inner panel 14. Furthermore, the upper flange 20D of the cowl reinforcement 20 is joined to the rear wall 14C of the cowl inner panel 14, the lower flange 20E of the cowl reinforcement 20 is joined to the bottom wall 14A of the cowl inner panel 14, and the closed cross section 22 is formed by the cowl inner panel 14 and the cowl reinforcement 20. Moreover, both vehicle width direction end portions of the cowl reinforcement 20 are joined to the front pillars 30 of the vehicle V. For this reason, the cowl inner panel 14 is reinforced by the cowl reinforcement 20, and front and rear direction vibration of the cowl inner panel 14 and the dash panel 34 is controlled. Therefore, the noise and vibration performance in the vehicle V can be improved.

Next, a case in which an impactor (object) I, such as the head of a pedestrian, impacts on the right side section of the lower end portion of the windshield WG will be described in comparison to a comparative example described below. In the comparative example, the hole portion 24 for shock absorption in the present embodiment is omitted from the vertical wall 20A of the cowl reinforcement 20, but the rest is configured in the same way as the cowl portion 10 of the present embodiment. In the following description of the comparative example, the same reference signs as those in the first embodiment are assigned to the same parts.

Figure 3:
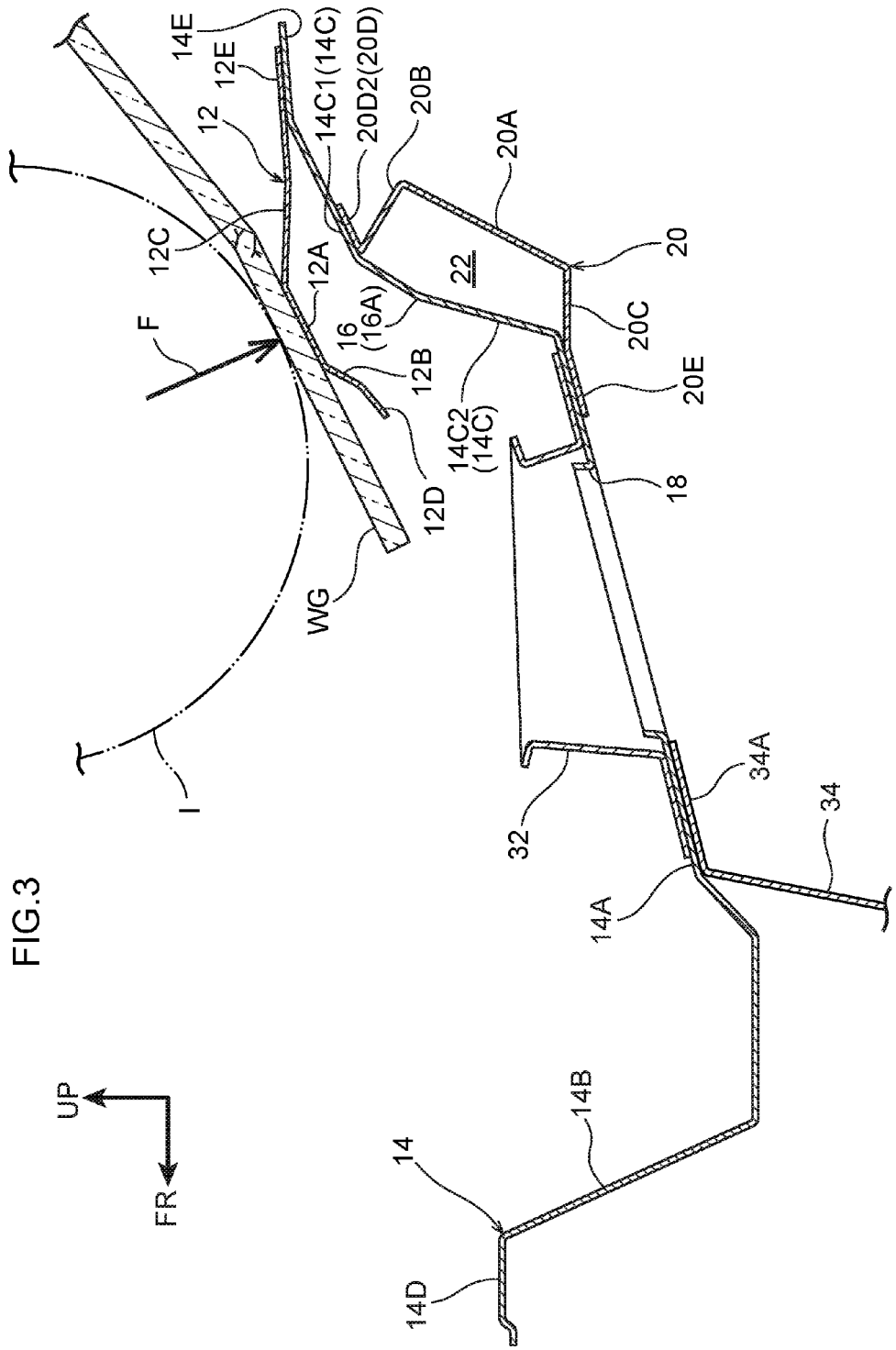
FIG. 3 is a side sectional view, seen from the vehicle left side, for describing, in relation to a cowl portion of a comparative example, deformation of the cowl portion when an impactor (object) has impacted on a lower end portion of a windshield.

As shown in FIG. 3, in the cowl portion 10 of the comparative example, when the impactor I impacts on the right side section of the lower end portion of the windshield WG, a downward impact load F is input to the windshield WG. At this time, the cowl top panel 12 deforms and the impact load F is transmitted from the rear flange 12E of the cowl top panel 12 to the rear flange 14E of the cowl inner panel 14.

In this connection, in the cowl portion 10, the upper flange right side portion 20D2 of the cowl reinforcement 20 is joined to the upper rear wall portion 14C1 of the rear wall 14C of the cowl inner panel 14. In other words, the upper flange right side portion 20D2 is joined to the upper rear wall portion 14C1 at the upper side of the bend ridgeline 16A (the bent portion 16) of the rear wall 14C (specifically, in the energy absorption area A (not shown in FIG. 3)) and is configured to support the upper rear wall portion 14C1 from the lower side. For this reason, when the impact load F is input to the rear flange 14E of the cowl inner panel 14, the rear wall 14C of the cowl inner panel 14 is kept from bending at the bend ridgeline 16A (the bent portion 16), and the joint portion where the upper rear wall portion 14C1 is joined to the rear flange 14E of the upper side section mainly bends (i.e., achieves the state shown in FIG. 3). That is, the upper portion of the upper rear wall portion 14C1 and the rear flange 14E displace downward together with the windshield WG and the cowl top panel 12.

Figure 4:
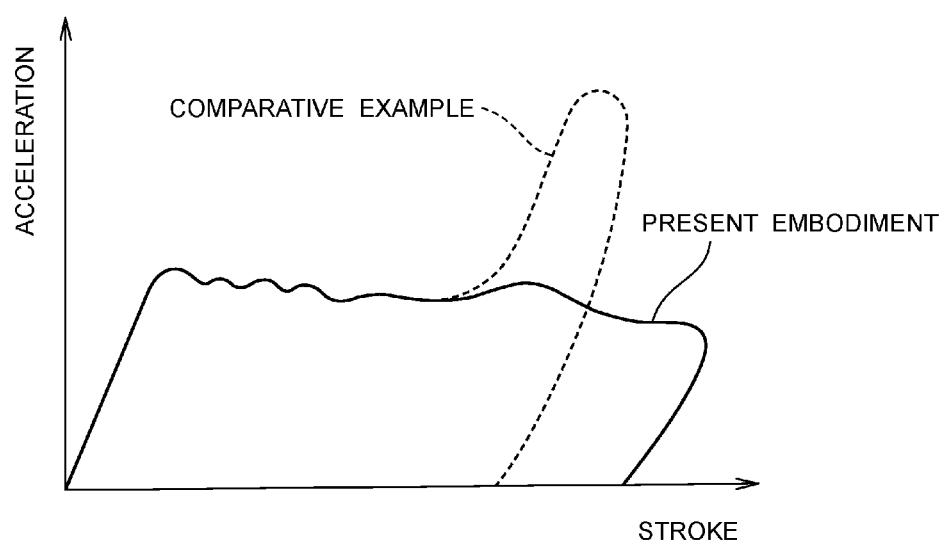
FIG. 4 is a graph for describing acceleration acting on the impactor when the impactor has impacted on the lower end portion of the windshield.

When the windshield WG and the cowl top panel 12 further displace downward, the cowl top panel 12 contacts the upper flange right side portion 20D2 of the cowl reinforcement 20 via the upper rear wall portion 14C1 of the cowl inner panel 14. At this time, the upper flange right side portion 20D2 supports the windshield WG and the cowl top panel 12 from the lower side. For this reason, the reaction force acting on the impactor I from the windshield WG is large and the (impact) acceleration acting on the impactor I is high. Specifically, as indicated by the dashed line in the graph of FIG. 4, in the later stage of the impact between the impactor I and the windshield WG, the acceleration acting on the impactor I is high. It should be noted that the horizontal axis of the graph shown in FIG. 4 is the stroke, toward the vehicle lower side, of the impactor I from when the impactor I hits the windshield WG and the vertical axis is the acceleration acting on the impactor I in relation to the stroke.

Furthermore, as mentioned above, the upper flange right side portion 20D2 is placed in the energy absorption area A. Therefore, before the impactor I reaches the stroke end position P (not shown in FIG. 3), the impactor I contacts the upper flange right side portion 20D2 of the cowl reinforcement 20 via the windshield WG, the cowl top panel 12, and the cowl inner panel 14. Thus, the stroke for absorbing the impact energy of the impactor I is shorter than the set stroke. Consequently, there is the potential for the impact energy absorption performance of the vehicle V to be poor.

In contrast, in the present embodiment, the hole portion 24 for shock absorption is formed through the vertical wall 20A of the cowl reinforcement 20 in a position corresponding to the upper flange right side portion 20D2. Therefore, the vertical wall 20A of the cowl reinforcement 20 is configured such that the up and down direction rigidity of the region around the hole portion 24 is lower than the up and down direction rigidity of other regions. Because of this, when the impact load F is input from the cowl inner panel 14 to the upper flange right side portion 20D2 of the cowl reinforcement 20, as shown in FIG. 5, (the vertical wall 20A of) the cowl reinforcement 20 deforms so as to crush in the up and down direction at the hole portion 24, and the upper flange right side portion 20D2 displaces downward. As a result, supporting of the upper flange right side portion 20D2 of the cowl reinforcement 20 by the upper rear wall portion 14C1 from the lower side is suppressed, the rear wall 14C of the cowl inner panel 14 bends at the bend ridgeline 16A (the bent portion 16), and the upper rear wall portion 14C1 and the rear flange 14E displace downward together with the windshield WG and the cowl top panel 12.

Because of this, as indicated by the solid line in the graph of FIG. 4, in the later stage of the impact between the impactor I and the windshield WG, the acceleration acting on the impactor I is kept from becoming high. Furthermore, since the impactor I can reach the area around the stroke end point P, the stroke for absorbing the impact energy of the impactor I can be made longer than in the comparative example. Consequently, even in a case in which the upper flange right side portion 20D2 is placed in the energy absorption area A, the impact energy absorption performance of the vehicle V can be improved. For the reasons described above, a balance can be achieved between the noise and vibration performance and the impact energy absorption performance of the vehicle V.

In the present embodiment, the cowl reinforcement 20 is placed at the rear side of the rear wall 14C of the cowl inner panel 14. Therefore, the impactor I impacting on the lower end portion of the windshield WG can be kept from hitting the cowl reinforcement 20.

Furthermore, in the present embodiment, the lower flange 20E of the cowl reinforcement 20 is joined to the bottom wall 14A of the cowl inner panel 14. Because of this, the area of the closed cross section 22 can be made larger than in a case in which the lower flange 20E of the cowl reinforcement 20 is joined to the lower rear wall portion 14C2 of the cowl inner panel 14. Consequently, the reinforcement effect that the cowl reinforcement 20 has on the cowl inner panel 14 can be enhanced, and front and rear direction vibration of the cowl inner panel 14 and the dash panel 34 can be effectively controlled.

In a case in which the impactor I impacts on the vehicle width direction central portion or the left side section of the lower end portion of the windshield WG, the rear wall 14C of the cowl reinforcement 20 bends at the bent portion 16 because the upper flange central portion 20D 1 and the upper flange left side portion 20D3 of the cowl reinforcement 20 are joined to the lower rear wall portion 14C2 of the cowl inner panel 14. For this reason, similarly to the case in which the impactor I impacts on the right side section of the lower end portion of the windshield WG, the acceleration acting on the impactor I is kept from becoming high and the impact energy with respect to the impactor I can be absorbed.

Next, variations of the embodiment of the cowl portion 10 will be described. In the description of the variations below, for the sake of convenience, the side sectional shape of a cowl top reinforcement 40 is set the same across the vehicle width direction.

(Variation 1)

Figure 6B:
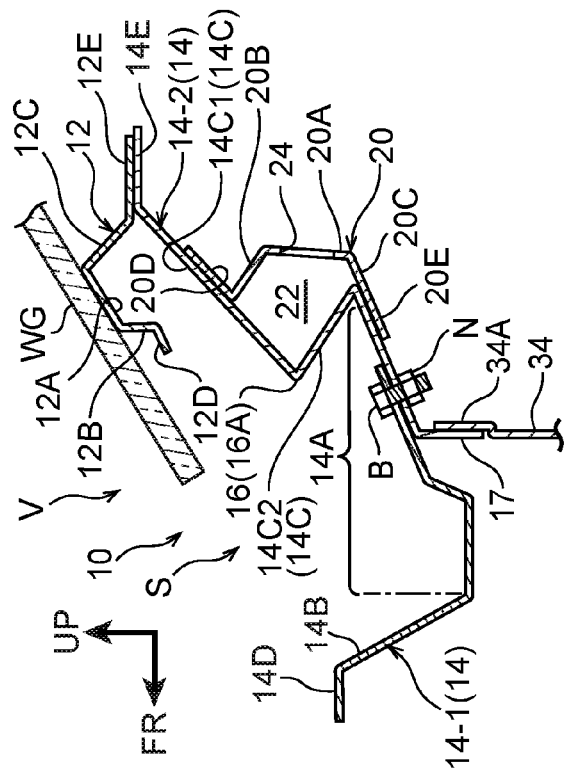
FIG. 6B is a side sectional view, seen from the vehicle left side, showing a cowl portion of variation 2.
Figure 6A:
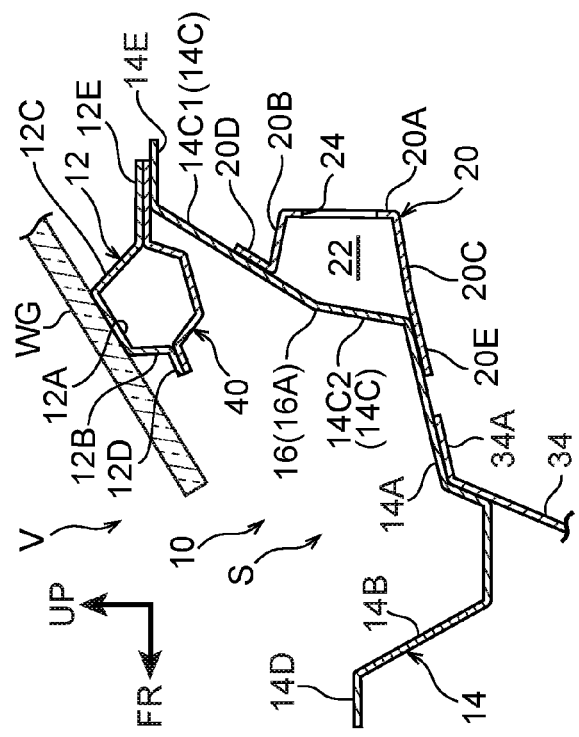
FIG. 6A is a side sectional view, seen from the vehicle left side, showing a cowl portion of variation 1.

In variation 1, the cowl portion 10 is configured similarly to the present embodiment except for the points indicated below. Namely, as shown in FIG. 6A, in variation 1, a cowl top reinforcement 40 for reinforcing the cowl top panel 12 is disposed at the lower side of the cowl top panel 12. The cowl top reinforcement 40 is formed in a substantially hat-shaped cross-section that is opened substantially upward and obliquely forward as seen in a side sectional view. The front end portion of the cowl top reinforcement 40 is joined to the front flange 12D of the cowl top panel 12. Furthermore, the rear end portion of the cowl top reinforcement 40 is sandwiched between the rear flange 12E of the cowl top panel 12 and the rear flange 14E of the cowl inner panel 14 and is joined to the rear flange 12E together with the rear flange 14E.

When a downward predetermined impact load is input to the windshield WG, the cowl reinforcement 20 deforms at the hole portion 24 for shock absorption, and the rear wall 14C of the cowl inner panel 14 bends at the bend ridgeline 16A (the bent portion 16). For this reason, variation 1 also achieves similar operation and effects as in the present embodiment.

Furthermore, in variation 1, the cowl top panel 12 is reinforced by the cowl top reinforcement 40, and the rear end portion of the cowl top reinforcement 40 is joined to the rear flange 12E together with the rear flange 14E. For this reason, the impact load input to the windshield WG can be efficiently transmitted via the cowl top panel 12 and the cowl inner panel 14 to (the upper flange 20D of) the cowl reinforcement 20.

(Variation 2)

In variation 2, the cowl portion 10 is configured similarly to the present embodiment except for the points indicated below. Namely, as shown in FIG. 6B, in variation 2, the cowl inner panel 14 is configured by two members divided in the front and rear direction. Specifically, the cowl inner panel 14 is divided at the bottom wall 14A and includes a first cowl inner panel 14-1 that configures the front side section of the cowl inner panel 14, and a second cowl inner panel 14-2 that configures the rear side section of the cowl inner panel 14. The section of the second cowl inner panel 14-2 configuring the bottom wall 14A is placed adjacent to the lower side of the section of the first cowl inner panel 14-1 configuring the bottom wall 14A, and both are fastened to one another by fastening members such as bolts B and nuts N.

Furthermore, a downwardly bent lower flange 17 is formed at the distal end portion of the section of the second cowl inner panel 14-2 configuring the bottom wall 14A. Moreover, the upper flange 34A of the dash panel 34 is formed in a substantially crank shape, and the upper flange 34A is placed adjacent to the rear side of the lower flange 17 and is joined to the lower flange 17. Furthermore, the rear wall 14C of the cowl inner panel 14 is formed in a substantially V-shape that opens rearward as seen in a side sectional view. In other words, the bent portion 16 of the rear wall 14C is bent so as to project forward.

In variation 2 also, when a downward predetermined impact load is input to the windshield WG, the cowl reinforcement 20 deforms at the hole portion 24 for shock absorption, and the rear wall 14C of the cowl inner panel 14 bends at the bend ridgeline 16A (the bent portion 16). For this reason, variation 2 in which the cowl inner panel 14 is divided also achieves similar operation and effects as in the present embodiment.

(Variation 3)

Figure 6D:
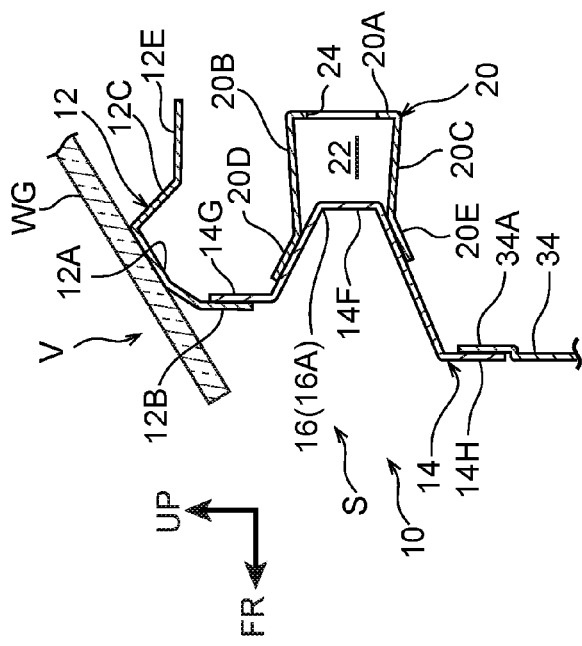
FIG. 6D is a side sectional view, seen from the vehicle left side, showing a cowl portion of variation 4.
Figure 6C:
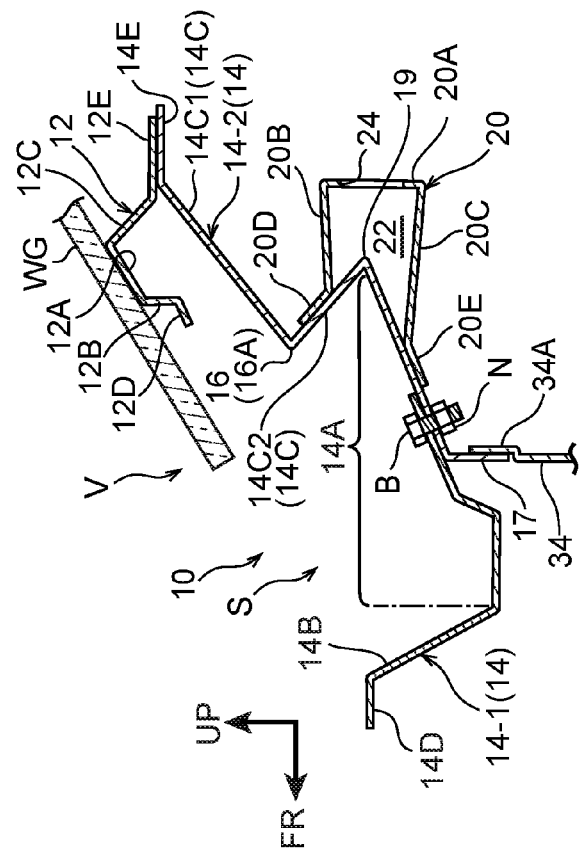
FIG. 6C is a side sectional view, seen from the vehicle left side, showing a cowl portion of variation 3.

In variation 3, as shown in FIG. 6C, the cowl inner panel 14 is configured by two members divided in the front and rear direction similarly to variation 2. Namely, the cowl inner panel 14 includes the first cowl inner panel 14-1 and the second cowl inner panel 14-2, and the first cowl inner panel 14-1 and the second cowl inner panel 14-2 are fastened to one another by fastening members such as bolts B and nuts N. The upper flange 34A of the dash panel 34 is joined to the lower flange 17 of the second cowl inner panel 14-2. Moreover, the rear wall 14C of the cowl inner panel 14 is bent in a substantially V-shape that opens rearward as seen in a side sectional view.

In variation 3, a bent portion 19 formed in the border section between the bottom wall 14A and the rear wall 14C (the lower rear wall portion 14C2) of the cowl inner panel 14 (in other words, a bent portion 19 formed in the lower end of the rear wall 14C) corresponds to the "bent portion" of the present disclosure. Thus, "with a bent portion being formed in the extension wall" in the present disclosure includes a case in which the bent portion is formed in the lower end of the extension wall. In variation 3, the cowl portion 10 is configured such that, when a downward predetermined impact load is input to the windshield WG, the cowl inner panel 14 bends at the bent portion 16 and the bent portion 19, and the lower flange 14E displaces downward.

Furthermore, the upper flange 20D of the cowl reinforcement 20 is joined to the lower rear wall portion 14C2 of the cowl inner panel 14, and the lower flange 20E of the cowl reinforcement 20 is joined to the bottom wall 14A of the cowl inner panel 14. In other words, the cowl reinforcement 20 is joined to the cowl inner panel 14 so as to cover (straddle) the bent portion 19 from the rear side.

When a downward predetermined impact load is input to the windshield WG, the cowl reinforcement 20 deforms at the hole portion 24 for shock absorption, and the cowl inner panel 14 bends at the bent portion 16 and the bent portion 19. For this reason, variation 3 also achieves similar operation and effects as in the embodiment.

(Variation 4)

In variation 4, the cowl portion 10 is configured similarly to the present embodiment except for the points indicated below. Namely, as shown in FIG. 6D, the front flange 12D is omitted from the cowl top panel 12. Furthermore, the cowl inner panel 14 is formed in a substantially hat-shapes cross-section that is opened forward as seen in a side sectional view. Specifically, the cowl inner panel 14 has a main body wall 14F that configures the up and down direction middle portion of the cowl inner panel 14 and extends in the up and down direction overall as seen in a side sectional view, an upper flange 14G serving as an "inner panel-side joint portion" that extends upward from the upper end of the main body wall 14F, and a lower flange 14H that extends downward from the lower end of the main body wall 14F.

The upper flange 14G is placed adjacent to the rear side of the front wall 12B of the cowl top panel 12 and is joined to the front wall 12B. The upper flange 34A of the dash panel 34 is formed in a crank shape as in variations 2 and 3 and is joined to the lower flange 14H. Moreover, two bent portions are formed in the up and down direction middle portion of the main body wall 14F, so that the main body wall 14F is formed in a substantially U-shape that opens forward. The bent portion at the upper side formed in the main body wall 14F is the bent portion 16, and the bent portion 16 is bent so as to project rearward and obliquely upward as seen in a side sectional view. That is, in variation 4, the cowl portion 10 is configured such that, when a predetermined impact load toward the vehicle lower side is input to the windshield WG, the cowl inner panel 14 bends at the bent portion 16, and the upper flange 14G displaces downward. Thus, in variation 4, the main body wall 14F corresponds to the "extension wall". Furthermore, the upper flange 20D of the cowl reinforcement 20 is joined to the main body wall 14F at the upper side of the bent portion 16, and the lower flange 20E of the cowl reinforcement 20 is joined to the main body wall 14F at the lower side of the bent portion 16.

When a downward predetermined impact load is input to the windshield WG, the cowl reinforcement 20 deforms at the hole portion 24 for shock absorption, the cowl inner panel 14 bends at the bend ridgeline 16A (the bent portion 16), and the upper flange 14G of the cowl inner panel 14 displaces downward together with the upper flange 20D of the cowl reinforcement 20. For this reason, variation 4, in which the cowl inner panel 14 is formed so as to project rearward as seen in a side sectional view, also achieves similar operation and effects as in the present embodiment.

(Variation 5)

In variation 5, the cowl portion 10 is configured similarly to the present embodiment except for the points indicated below. Namely, as shown in FIG. 7A, the cowl reinforcement 20 extends further upward than in the present embodiment. Specifically, the upper wall 20B of the cowl reinforcement 20 is placed at the upper side of the rear flange 12E of the cowl top panel 12. The upper flange 20D of the cowl reinforcement 20 is placed adjacent to the rear side of the rear wall 12C of the cowl top panel 12 and is joined to the rear wall 12C. Furthermore, the lower flange 20E is omitted from the cowl reinforcement 20, and the front end portion of the lower wall 20C of the cowl reinforcement 20 is joined to the bottom wall 14A of the cowl inner panel 14. Thus, in variation 5, the lower wall 20C configures the lower end portion of the cowl reinforcement 20, and the area of the closed cross section 22 as seen in a side sectional view is set larger than in the present embodiment.

When a downward predetermined impact load is input to the windshield WG, the cowl reinforcement 20 deforms at the hole portion 24 for shock absorption, and the rear wall 14C of the cowl inner panel 14 bends at the bend ridgeline 16A (the bent portion 16). For this reason, variation 5 also achieves similar operation and effects as in the present embodiment.

Furthermore, in variation 5, the upper flange 20D of the cowl reinforcement 20 is joined to (the rear wall 12C of) the cowl top panel 12. For this reason, as mentioned above, the area of the closed cross section 22 as seen in a side sectional view can be set larger than in the present embodiment. Therefore, the reinforcement effect that the cowl reinforcement 20 has on the cowl inner panel 14 can be further enhanced.

(Variation 6)

In variation 6, the cowl portion 10 is configured similarly to the present embodiment except for the points indicated below. Namely, as shown in FIG. 7B, the cowl reinforcement 20 extends further upward than in the present embodiment as in variation 5. Furthermore, the upper flange 20D is omitted from the cowl reinforcement 20, and the front end portion of the upper wall 20B is placed adjacent to the lower side of the rear flange 14E of the cowl inner panel 14 and is joined to the rear flange 12E of the cowl top panel 12 together with the rear flange 14E. Moreover, similarly to variation 5, the lower flange 20E is omitted from the cowl reinforcement 20, and the front end portion of the lower wall 20C of the cowl reinforcement 20 is joined to the bottom wall 14A of the cowl inner panel 14. Thus, in variation 6, the upper wall 20B configures the upper end portion of the cowl reinforcement 20, and the lower wall 20C configures the lower end portion of the cowl reinforcement 20. Furthermore, in variation 6 also, the area of the closed cross section 22 as seen in a side sectional view is set larger than in the present embodiment.

When a downward predetermined impact load is input to the windshield WG, the cowl reinforcement 20 deforms at the hole portion 24 for shock absorption, and the rear wall 14C of the cowl inner panel 14 bends at the bend ridgeline 16A (the bent portion 16). Therefore, variation 6 also achieves similar operation and effects as in the present embodiment.

Furthermore, in variation 6, the upper wall 20B of the cowl reinforcement 20 is joined to the joint portion (specifically, the rear flange 14E of the cowl inner panel 14) where the cowl inner panel 14 and the cowl top panel 12 are joined to one another. That is, the upper end portion of the cowl reinforcement 20 is joined to the rear flange 14E that is configured to be relatively high in strength as a result of being joined to the rear flange 12E of the cowl top panel 12. Because of this, the impact load input to the windshield WG is efficiently transmitted via the cowl top panel 12 to the upper end portion of the cowl reinforcement 20, so the cowl reinforcement 20 can be efficiently deformed at the hole portion 24 for shock absorption.

(Variation 7)

In variation 7, the cowl portion 10 is configured similarly to the present embodiment except for the points indicated below. Namely, as shown in FIG. 8, the cowl reinforcement 20 is placed at the front side of the rear wall 14C of the cowl inner panel 14 and is bent in a substantially crank shape as seen in a side sectional view. Specifically, the cowl reinforcement 20 includes a vertical wall 20F that extends in the substantially up and down direction at the front side of the rear wall 14C of the cowl inner panel 14, and an upper wall 20G that extends rearward from the upper end of the vertical wall 20F. Furthermore, the cowl reinforcement 20 has a lower flange 20H that extends substantially forward from the lower end of the vertical wall 20F and is placed parallel to the bottom wall 14A of the cowl inner panel 14, and an upper flange 20I that extends substantially upward from the rear end of the upper wall 20G and is placed parallel to the upper rear wall portion 14C1 of the cowl inner panel 14. The lower flange 20H is placed adjacent to the upper side of the bottom wall 14A and is joined to the bottom wall 14A. The upper flange 20I is placed adjacent to the front side of the upper rear wall portion 14C1 and is joined to the upper rear wall portion 14C1. Moreover, the hole portion 24 for shock absorption is formed in the vertical wall 20F.

When a downward predetermined impact load is input to the windshield WG, the cowl reinforcement 20 deforms at the hole portion 24 for shock absorption, and the rear wall 14C of the cowl inner panel 14 bends at the bend ridgeline 16A (the bent portion 16). For this reason, variation 7 also achieves similar operation and effects as in the present embodiment.

Furthermore, in variation 7, the cowl reinforcement 20 is placed at the front side of the rear wall 14C of the cowl inner panel 14. For this reason, the cowl reinforcement 20 can be installed while preventing interference between the cowl reinforcement 20 and peripheral parts placed at the rear side of the cowl inner panel 14.

In the above embodiment, part (the upper flange right side portion 20D2) of the upper flange 20 is placed at the upper side of the bend ridgeline 16A (the bent portion 16). Instead of this, all of the upper flange 20D may be placed at the upper side of the bend ridgeline 16A (the bent portion 16) in correspondence to the specifications of various types of vehicles. In this case, plural hole portions 24 for shock absorption may be formed in the vertical wall 20A of the cowl reinforcement 20, and the plural hole portions 24 may be placed side by side in the vehicle width direction.

In the above embodiment, one hole portion 24 for shock absorption is formed in the vertical wall 20A of the cowl reinforcement 20. Instead of this, plural hole portions 24 may be formed and the plural hole portions 24 may be placed side by side in the vehicle width direction in correspondence to the up and down direction rigidity of the cowl reinforcement 20. Furthermore, likewise in variation 1 to variation 7, plural hole portions 24 may be formed and the plural hole portions 24 may be placed side by side in the vehicle width direction in correspondence to the up and down direction rigidity of the cowl reinforcement 20.

In the above embodiment and in variation 1 to variation 7, the hole portion 24 for shock absorption is formed in a circular shape, but the shape of the hole portion 24 is not limited to this. For example, the hole portion 24 may also be formed as a long hole whose lengthwise direction coincides with the up and down direction or the vehicle width direction. For example, in a case in which the hole portion 24 is formed as a long hole whose lengthwise direction coincides with the up and down direction, the upper end portion of the hole portion 24 may extend as far as the upper wall 20B of the cowl reinforcement 20 and the lower end portion of the hole portion 24 may extend as far as the lower wall 20C of the cowl reinforcement 20. In other words, the cowl portion 10 may be configured such that the hole portion 24 is formed in at least one of the bent portions formed in the upper and lower ends of the vertical wall 20A of the cowl reinforcement 20. Furthermore, for example, in a case in which the hole portion 24 is formed as a long hole whose lengthwise direction coincides with the vehicle width direction, plural hole portions 24 may be formed side by side in the up and down direction. That is, the shape and so forth of the hole portion 24 may be appropriately changed to adjust the up and down direction rigidity of the cowl reinforcement 20.

Furthermore, in the above embodiment and in variation 1 to variation 7, the cowl reinforcement 20 extends in the vehicle width direction and couples the right and left pair of front pillars 30 to one another, but the lengthwise direction length and position of the cowl reinforcement 20 may be appropriately changed in appropriate correspondence to the specifications and the like of the vehicle. For example, the cowl portion 10 may be given a configuration in which the lengthwise direction length of the cowl reinforcement 20 is set shorter than it is in the embodiment so that the right and left pair of front pillars 30 are not coupled to one another by the cowl reinforcement 20.

What is claimed is:

1. A vehicle cowl portion structure comprising:
    a cowl top panel that is configured to extend in a vehicle width direction along a lower end portion of a windshield;
    a cowl inner panel that is configured to extend in the vehicle width direction on a vehicle lower side of the cowl top panel, the cowl inner panel including an inner panel-side joint portion that is joined to the cowl top panel and an extension wall that extends from the inner panel-side joint portion toward the vehicle lower side and has a bent portion, the cowl inner panel bending at the bent portion upon receipt of a predetermined impact load toward the vehicle lower side; and
    a reinforcement that is configured to extend in the vehicle width direction, the reinforcement including (i) an upper end portion that is joined to the cowl inner panel or the cowl top panel at a position that is on a vehicle upper side of the bent portion, (ii) a lower end portion that is joined to the cowl inner panel at a position that is on a vehicle lower side of the bent portion, and (iii) a vertical wall that extends in a vehicle up and down direction as seen in a side sectional view, the vertical wall having a hole through the vertical wall.

2. The vehicle cowl portion structure according to claim 1, wherein the reinforcement is located at a vehicle rear side of the extension wall.

3. The vehicle cowl portion structure according to claim 1, wherein the reinforcement is located at a vehicle front side of the extension wall.

4. The vehicle cowl portion structure according to claim 1, wherein the cowl inner panel has a recessed shape that opens toward the vehicle upper side as seen in the side sectional view, and
    the lower end portion of the reinforcement is joined to a bottom wall of the cowl inner panel.

5. The vehicle cowl portion structure according to claim 1, wherein the cowl top panel includes
    a top panel-side joint portion that is joined to the inner panel-side joint portion,
    an opposing wall that is configured to be placed opposing the lower end portion of the windshield, and
    a coupling wall that couples the top panel-side joint portion and the opposing wall to each other, and
    the upper end portion of the reinforcement is joined to the coupling wall.

6. The vehicle cowl portion structure according to claim 1, wherein the upper end portion of the reinforcement is joined to a joint location where the cowl top panel and the inner panel-side joint portion of the cowl inner panel are joined to each other.

7. The vehicle cowl portion structure according to claim 1, further comprising a recessed cowl top reinforcement that is disposed at the vehicle lower side of the cowl top panel and opens substantially upward and obliquely forward as seen in the side sectional view,
    wherein a front end portion of the cowl top reinforcement is joined to a front end portion of the cowl top panel, and a rear end portion of the cowl top reinforcement is interposed between a rear end portion of the cowl top panel and the inner panel-side joint portion of the cowl inner panel and interconnects the cowl top panel and the cowl inner panel.

8. The vehicle cowl portion structure according to claim 1, wherein the bent portion of the cowl inner panel is bent so as to project toward the vehicle front side.

9. The vehicle cowl portion structure according to claim 1, wherein the bent portion of the cowl inner panel is bent so as to project toward the vehicle rear side.

10. The vehicle cowl portion structure according to claim 1, wherein the cowl inner panel has a recessed shape that opens toward the vehicle front side as seen in the side sectional view.

* * * * *